(12) United States Patent
Hanke et al.

(10) Patent No.: US 10,168,182 B2
(45) Date of Patent: Jan. 1, 2019

(54) SHAFT ENCODER WITH MAGNETIC SHIELD

(71) Applicant: Baumer Hübner GmbH, Berlin (DE)

(72) Inventors: Martin Hanke, Berlin (DE); Bernhard Hiller, Berlin (DE)

(73) Assignee: Baumer Hübner GmbH, Berlin (DE)

( * ) Notice: Subject to any disclaimer, the term of this patent is extended or adjusted under 35 U.S.C. 154(b) by 3 days.

(21) Appl. No.: 15/358,491

(22) Filed: Nov. 22, 2016

(65) Prior Publication Data

US 2017/0146365 A1 May 25, 2017

(30) Foreign Application Priority Data

Nov. 23, 2015 (EP) ..................................... 15195928

(51) Int. Cl.
*G01D 5/12* (2006.01)
*G01D 5/14* (2006.01)

(52) U.S. Cl.
CPC ................. *G01D 5/12* (2013.01); *G01D 5/14* (2013.01)

(58) Field of Classification Search
CPC .................................... G01D 5/12; G01D 5/14
USPC .................................................... 324/207.25
See application file for complete search history.

(56) References Cited

U.S. PATENT DOCUMENTS

| | | | | |
|---|---|---|---|---|
| 5,130,650 A * | 7/1992 | Lemarquand | ........... | G01P 3/443 324/207.22 |
| 5,880,367 A * | 3/1999 | Vaughn | .................. | B62D 15/02 180/400 |
| 6,212,783 B1 * | 4/2001 | Ott | ........................ | F02P 7/067 324/207.2 |
| 6,356,073 B1 * | 3/2002 | Hamaoka | ............... | G01D 5/145 324/207.2 |
| 6,448,762 B1 * | 9/2002 | Kono | ....................... | F02D 9/10 123/617 |
| 6,498,479 B1 * | 12/2002 | Hamaoka | ................. | G01B 7/30 324/174 |
| 6,693,422 B2 * | 2/2004 | Lutz | ......................... | G01B 7/30 310/68 B |
| 6,906,513 B2 * | 6/2005 | Dunisch | ................... | G01P 3/49 324/164 |

(Continued)

FOREIGN PATENT DOCUMENTS

| | | |
|---|---|---|
| DE | 601 00 635 T2 | 6/2004 |
| EP | 2486373 B1 * | 1/2017 ......... G01D 5/24447 |

(Continued)

*Primary Examiner* — Jay Patidar
(74) *Attorney, Agent, or Firm* — McGlew and Tuttle, P.C.

(57) ABSTRACT

A shaft encoder arrangement (1) provides high precision and at the same time can be used in harsh environments and is simple to mount. The shaft encoder arrangement (1) has at least one measuring device (2) for determining a rotary position of a rotatable body, for example, of a shaft (4) of a motor (6), with at least one magnetic dimensional scale (7) that can be mounted on the body and at least one sensor device (8) for scanning the magnetic dimensional scale (7). The sensor device (8) lies at least partially within a space (14) enclosed by the magnetic dimensional scale (7), and the magnetic dimensional scale (7) is enclosed by a circumferential magnetic shield (12). The magnetic shield permits use of the shaft encoder arrangement (1) even in harsh environments and even in strong magnetic interference fields.

15 Claims, 4 Drawing Sheets

(56) References Cited

U.S. PATENT DOCUMENTS

| | | | |
|---|---|---|---|
| 7,498,803 B2* | 3/2009 | Horie | G01D 5/145 324/207.2 |
| 2001/0000713 A1* | 5/2001 | Nakamura | F16C 19/185 384/448 |
| 2009/0072816 A1* | 3/2009 | Schrubbe | G01D 5/06 324/207.2 |
| 2011/0006757 A1* | 1/2011 | Mehnert | G01D 5/145 324/207.2 |
| 2014/0191625 A1* | 7/2014 | Kitamoto | G01D 3/08 310/68 B |
| 2015/0160041 A1* | 6/2015 | Hikichi | G01D 5/34707 324/207.25 |

FOREIGN PATENT DOCUMENTS

| | | |
|---|---|---|
| WO | 03/098147 A1 | 11/2003 |
| WO | 2014/135453 A1 | 9/2014 |

* cited by examiner

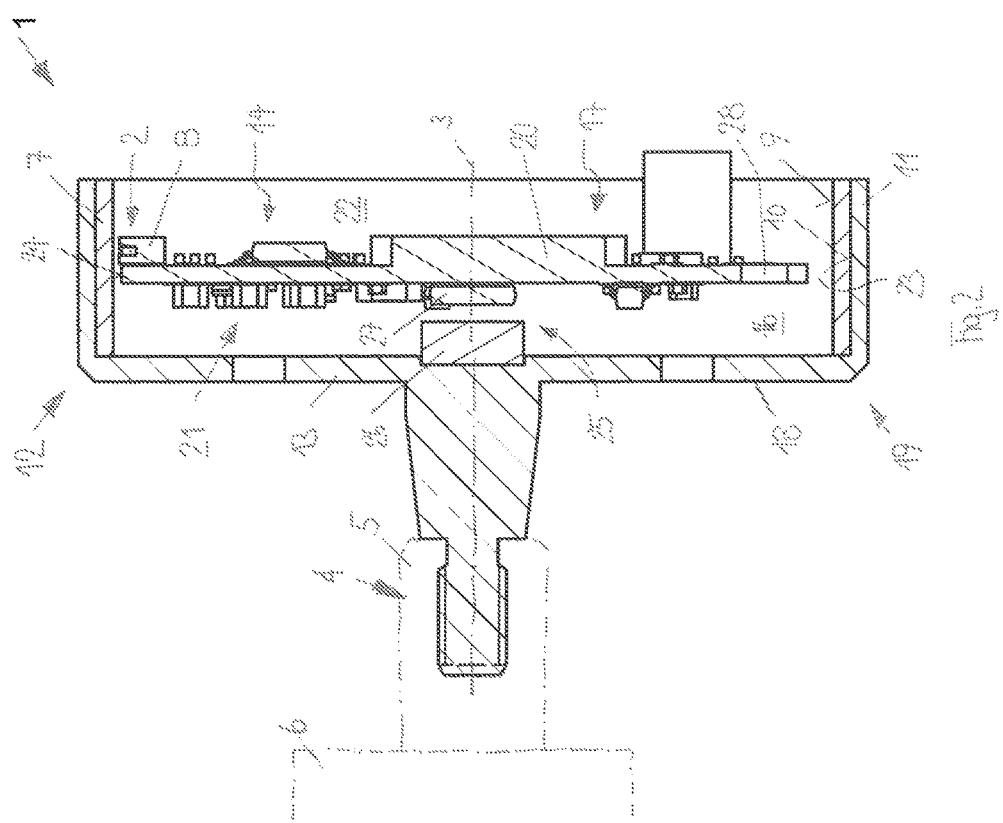

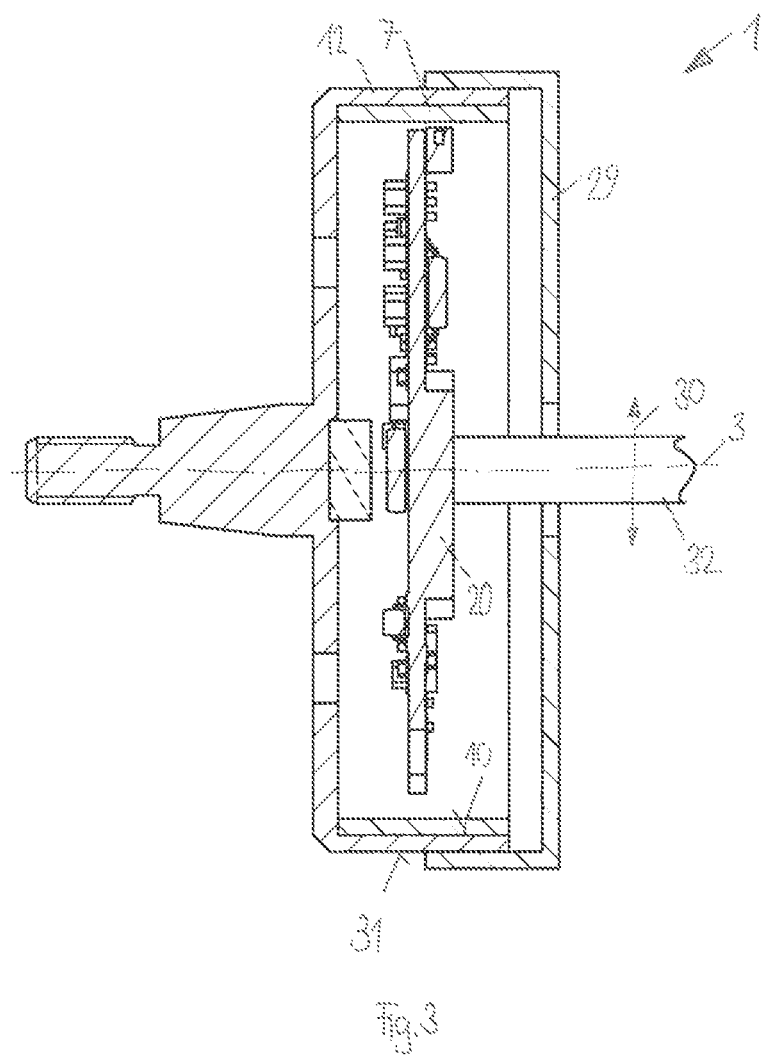

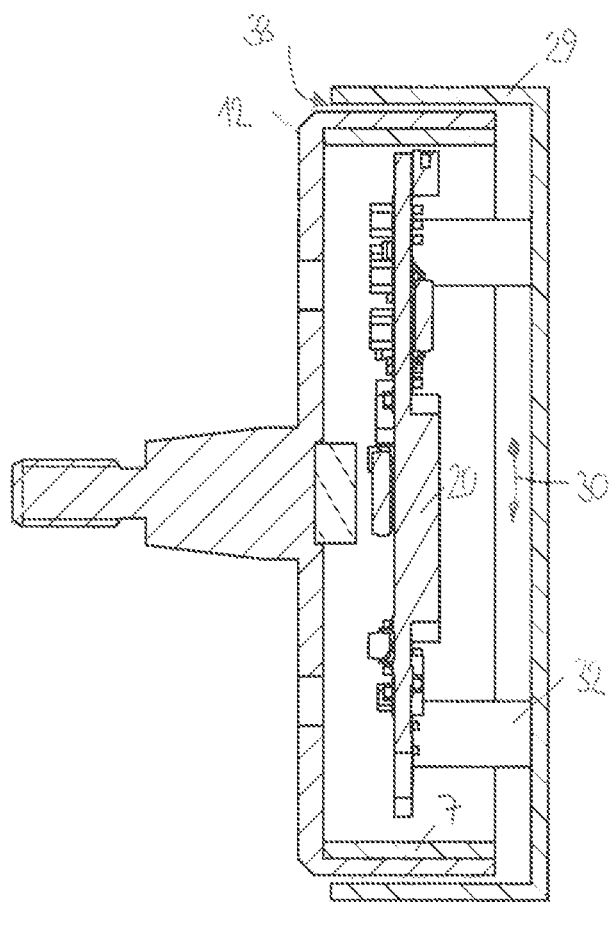

SHAFT ENCODER WITH MAGNETIC SHIELD

CROSS REFERENCE TO RELATED APPLICATIONS

This application claims the benefit of priority under 35 U.S.C. § 119 of European Application 15 195 928.5 filed Nov. 23, 2015, the entire contents of which are incorporated herein by reference.

FIELD OF THE INVENTION

The present invention pertains to a shaft encoder arrangement with a measuring device for determining a rotary position of a rotatable body, for example, a shaft of a motor.

BACKGROUND OF THE INVENTION

A variety of shaft encoder arrangements are known from the state of the art. The prior-art systems are, however, imprecise, delicate or require a high precision during mounting.

SUMMARY OF THE INVENTION

The object of the present invention is to provide a solution that provides a high precision, is simple to mount and at the same time can be used in harsh environments.

This object is accomplished by a shaft encoder arrangement with a measuring device for determining a rotary position of a rotatable body with at least one magnetic dimensional scale (magnetic measuring scale/magnetic material measure/magnetic measuring marker) that can be fastened to the body and at least one sensor device for scanning the material measure. The sensor device lies at least partially within a space enclosed by the material measure, and the material measure is enclosed by a circumferential magnetic shield and is mounted on same in a nonrotatable manner.

The dimensional scale permits a measurement with a high precision. Due to the mounting on the rotatable body, a separate mount for the dimensional scale can be dispensed with, as a result of which the configuration of the shaft encoder arrangement is highly simplified. The magnetic shield permits use even in harsh environments, for example, in the direct vicinity of electric motors or magnetic brakes, where strong magnetic fields occur. In case of rapidly rotatable bodies, the shield is also used for mechanically fixing the magnetic dimensional scale against centrifugal forces, especially at high speeds. Thus, it makes the bandages used up to now as mechanical protection superfluous.

Another advantage of the configuration according to the present invention is that the sensor device and possibly the electronic analysis unit are limited to a small area around the axis of rotation. The sensor device may consequently be equipped with additional sensors, without long lines around the rotatable body being necessary, as in case of a sensor device arranged about the outer circumference of the rotatable body.

The solution according to the present invention can be further improved with the following configurations and further developments, which are each advantageous in themselves.

Thus, the shield shall be made of a magnetically well-conductive, especially ferromagnetic material in order to shield well against interference fields. The material and the material thickness can be adapted such that the shield does not reach the point of saturation in case of the magnetic flux density occurring during the operation. Further, the shield may be a turned part or a milled part. Such a manufacture is simple in case of a rotationally symmetrical configuration. A manufacture as a stamping-and-bending part is also possible.

As an alternative or cumulatively, the shield may be a deep-drawn part. The manufacture of a deep-drawn part is especially cost-effective.

The shield may be configured as a shielding body, i.e., consequently monolithic. The receiving body may have a receptacle, within which the sensor device can be arranged. The receptacle may be milled in or punched in or be made of a ferromagnetic sheet metal by bending or folding.

The receptacle may be open on a side located in the axial direction, but otherwise is configured as closed on all sides. The mounting and stationary fixing of the sensor device are carried out through the open side. The receptacle can offer mechanical protection against external effects. Further, the receptacle may also form a shield against electrical or magnetic fields, so that the dimensional scale arranged therein and the sensor device are not affected by external interference fields.

The dimensional scale may be arranged on the inner side of the receptacle facing the sensor device and enclosing the sensor device in a circumferential direction. As a result, a compact configuration is possible.

The shaft encoder arrangement preferably has no bearings and can be fastened directly to a shaft of a motor, especially an electric motor, or to another rotatable body. For this, a fastening section may be used, which is nonrotatably connected to the shield, but is preferably formed monolithically by same. The fastening section preferably permits a coupling-free connection to the shaft of the motor.

In case of electric motors, this type of mounting may expose the sensor device to strong magnetic interference fields, because the shaft encoder arrangement is located very close to the electric motor with a possibly additionally electromagnetically aerated brake. At this point, the magnetic fields of the electric motor and/or of the brake enter into the shaft encoder.

According to another advantageous configuration, the shield comprises a disk-shaped section which is connected to the circumferential shield carrying the dimensional scale and which is preferably nonrotatably connected to the rotatable body and extends at right angles to the axis of rotation, in order to protect the sensor device against these interference fields. The shielding disk may be combined monolithically with the circumferential shield to form the shielding body or be mounted as a separate part on the circumferential shield carrying the dimensional scale, for example, by a circumferential crimping, welding or by means of fastening means.

The fastening section, with which the shaft encoder arrangement is mounted on the rotatable body preferably indirectly, but especially without interconnected coupling, may be mounted on the disk-shaped section of the shield. The sensor device may be arranged within the cubature (internal cubic volume) of the shield. The sensor device is consequently protected. In addition, the space requirement of the shaft encoder arrangement is minimal, since the reconstructed space is utilized.

The sensor device may have a stationarily mountable configuration, so that it does not rotate with the body during the measurement. The sensor device on one side and the dimensional scale with the shield on the other side are preferably arranged in a contact-free manner to one another and are, for example, separated from one another by an air gap. The air gap may run coaxially to the axis of rotation of the body.

In case of a bearing-less configuration of the shaft encoder arrangement, the dimensional scale and the sensor device are preferably situated on structurally separate parts, which have no mechanical connection to one another. Consequently, the shaft encoder arrangement is low-wear, simple to maintain and cost-effective to manufacture.

The shaft encoder arrangement may have a support plate, which lies at least partially within the space enclosed by the dimensional scale and is preferably arranged concentrically to the shield and axis of rotation. The sensor device and the electronic analysis unit may be arranged at or on the support plate. The support plate preferably extends at right angles to the axis of rotation, especially towards the disk-shaped shield. Consequently, the shaft encoder arrangement is compact, since no extra space has to be made available for the support plate in the shield. Preferably, the support plate lies completely within the space enclosed by the dimensional scale.

The support plate may be stationary. It is preferably structurally separated from the dimensional scale and the shield carrying it. It is especially not mechanically connected to the shield and to the dimensional scale, but rather is preferably separated by a circumferential gap, which may be concentric.

The support plate may also be a circuit board or a printed circuit board. Consequently, complicated mounting processes or special mounting brackets for the sensor device and the electronic analysis unit can be dispensed with.

However, the support plate is preferably made of a ferromagnetic material and thus is a part of the shield. In order to reinforce the shield, the support plate may have an axial edge, preferably protruding toward the rotatable body, which edge encloses the sensor device at least in some sections on the outside. The support plate is, for example, cup-shaped in this configuration. The edge of the support plate has an as short as possible distance to the circumferential shield carrying the dimensional scale and may run especially parallel to the cylindrical inner surface of the shield.

The sensor device as well as the electronic analysis unit are preferably located between the support plate and the shield.

The shield may have a bell-shaped or pot-shaped configuration to guarantee an as comprehensive as possible protection and an as comprehensive as possible shielding and at the same time to make possible an access to the interior space axially from one side. The bell lies concentrically to the axis of rotation. It may have an especially rotationally symmetrical configuration and be open on one side, which is intersected by the axis of rotation. The bell may be closed on the other sides. The bottom of the bell preferably points to the electric motor in case of a shaft encoder arrangement mounted on the body. The bell shape or pot shape thus offers a good shielding against axial and radial magnetic fields.

The shaft encoder arrangement may comprise an additional shield. The additional shield may be adapted to the first shield and especially have an inverse configuration to same. For example, the additional shield may likewise have a bell shape and be pushed into the existing shield or over the existing shield. The bottom of the additional shield may be located opposite the disk-shaped shield, wherein the sensor device or support plate shall be arranged between the bottom of the additional shield and the disk-shaped shield in order to be shielded as much as possible. Instead of a bell shape, the additional shield may be disk-shaped in an especially simple embodiment.

The additional shield shall close the open side of the shield with the dimensional scale in order to improve the shield.

The additional shield may have a stationarily fastenable configuration or be nonrotatably connected to the shield carrying the dimensional scale.

In case of a stationary configuration, the additional shield may be connected to the support plate and have a section for mounting on a stationary mounting bracket, for example, the housing or end plate of the electric motor.

The stationary additional shield may be separated by an air gap from the shield with the dimensional scale, wherein, with a cylindrical surface, it preferably overlaps the cylindrical surface of the shield with the dimensional scale in the axial direction, i.e., in the direction of the axis of rotation, in order to prevent the penetration of stray fields through the air gap. The additional shield preferably protrudes up to over the dimensional scale.

If the additional shield is connected nonrotatably to the shield with the dimensional scale, then it may have a passage, through which a support extends to a fixing point outside of the shaft encoder arrangement for the stationary fixing of the sensor device or the support plate. The passage may sit centrally in the shield.

The additional shield may be permanently connected to the cylindrical section of the shield with the dimensional scale, for example, by crimping, soldering, welding, pressing, heat-shrinking or by fastening means such as screws. The two shields are preferably connected via the cylindrical outer surface of one of the two shields, preferably of the shield with the dimensional scale. In this case as well, the two shields may overlap with their cylindrical surfaces in the axial direction, so that the shields lie above one another in the radial direction.

The measuring device may comprise a plurality of sensor devices, which scan the dimensional scale at various points. For example, two sensor devices may be offset by 180° or four sensor devices may be offset by 90° in order to make possible a correction of a run-out error and/or a wobble error. The signal paths of these additional sensors are short, since the electronic analysis unit may be located centrally between these sensors.

The sensor device may further be configured to detect and to compensate run-out errors and wobble motions. This is especially important in case of a bearing-less configuration of the shaft encoder arrangement, in which the dimensional scale and the sensor device are mounted at different reference points.

If the shaft encoder arrangement comprises an electronic analysis unit, at least a partial analysis of the signals is already possible in the shaft encoder arrangement and not first in a subsequent step. As already mentioned, the electronic analysis unit may be arranged at least partially on the support plate. Consequently, it is protected and takes up little space. The electronic analysis unit may comprise a variety of electrical and electronic components, which may be, for example, analog or digital. ICs such as ASICs, processors or FPGAs may especially be present. An intelligent signal processing or analysis logic may be present.

The signal processing may link a variety of sensor data. It may comprise filters to filter out certain frequencies, for example, resonance frequencies. A signal improvement can be achieved by means of algorithms such as offset, amplitude and phase regulation by means of the signal processing. Improvements may also be achieved by using a plurality of sensors, especially for compensation for run-out errors and wobble errors. The signal processing may comprise an electronic type plate. It may determine the rotary position, speed of rotation and/or rotational acceleration of the body. The signal processing may output signals at an interface.

The dimensional scale may form an internal cylindrical jacket surface. In the mounted state, it may run around an axis of rotation of the rotatable body. A cylindrical jacket surface thereby permits a rotation with almost equal distance from the axis of rotation. Further, an offset along the axis of rotation, for example, due to an imprecise mounting or due to temperature effects, can be compensated. In another embodiment, the dimensional scale may form the shape of a different rotational body, for example, a frustoconical jacket surface.

The sensor device may lie completely within the space enclosed by the dimensional scale in order to make possible a well-protected and compact configuration.

The dimensional scale may be arranged on an inner side of the shield. The dimensional scale may be part of the shield or be connected directly to the shield. Consequently, the production cost is kept low and the space requirement is minimal.

The dimensional scale may be arranged on an inner side of a cylindrical section. The shield may have additional sections, for example, disk-shaped, ball-cup-shaped or conical-surface-shaped sections. Such a section may be closed especially alone or together with other parts in order to guarantee a good protection or a good shielding. The measuring device may be configured for determining a fine value of the rotary position. Since such a fine value does not have to absolutely clearly be within a 360° rotation, the shaft encoder arrangement may have an additional measuring device for determining a coarse value of the rotary position. A clear, absolute position with fine resolution can be determined by a combination of the fine value with the coarse value.

The additional measuring device may comprise a one-part or multipart center magnet for mounting on the body. The additional measuring device may have an additional sensor device for the center magnet. This additional measuring device may lie especially on the support plate and/or within a space enclosed by the dimensional scale. The center magnet may be mountable on and/or in the shield and/or be nonrotatably connectable to same.

The center magnet can at the same time be used for determining a single-turn or a multi-turn absolute position with a Wiegand sensor and with another technique.

The additional measuring device may lie at least partially within the space enclosed by the dimensional scale, especially when it is a magnetically measuring device. A shielding from external magnetic fields is consequently possible again.

Thus, the additional measuring device may comprise a Wiegand sensor, so that, for example, not only an absolute single-turn position, but also a multi-turn position can be determined. Thanks to the shield, the Wiegand sensor, which is highly sensitive to magnetic interference fields, can now also be used in direct vicinity of a strong magnetic field by means of the configuration according to the present invention.

Two tracks may have a variety of graduations in order to make possible a single-turn or pitch-circle absolute position by means of the Nonius principle. Correspondingly, a plurality of sensor devices may be present for measuring.

The shield according to the present invention makes possible precisely the use of such a sensitive measuring device as the Wiegand sensor or a Nonius even in the vicinity of strong magnetic interference fields.

The dimensional scale may be incremental. For example, a regular pattern may form the dimensional scale. Such a dimensional scale can be manufactured in a simple manner.

The shield may be provided at least in some areas and preferably on the surface with lacquers or cast resins in order to dampen or shift, for example, undesired resonant frequencies. Furthermore, absorbers and insulation mats may be used on the shield for damping vibrations. The dimensional scale may have more than one track. Consequently, a more accurate or a faster measurement may be possible. A plurality of sensor devices may be present for scanning a plurality of tracks of the dimensional scale. A sensor device may have a plurality of sensor elements for scanning a plurality of tracks of the dimensional scale. The shaft encoder arrangement may have a plurality of dimensional scales each with at least one track.

The track may have one or a plurality of zero graduations in order to make the determination of the rotary position possible. A sensor device may be present for scanning a zero graduation.

The track may contain pseudo random code in order to determine a single-turn absolute position. Corresponding sensor devices may be present for scanning such a track.

The shaft encoder arrangement may have additional magnets on a pitch circle for the determination of a multi-turn absolute position by means of a m-generator. The shaft encoder arrangement may have corresponding sensor devices.

An acceleration sensor, a rate of rotation sensor and/or a temperature sensor may be present, which especially lie within the space enclosed by the dimensional scale. These may be arranged at or on the support plate.

The electronic analysis unit and signal processing may be adapted to the above-described measuring principles.

The electronic analysis unit and/or the signal processing may comprise inputs and interfaces for additional data or measured values, for example, for a winding temperature sensor.

The electronic analysis unit and/or the signal processing may be configured to compare the values of a plurality of sensor devices and thereby determine the rotary position of the body with certainty. For example, a plurality of incremental tracks may be compared with one another or an incremental track may be compared with a coarse value.

The present invention is explained in greater detail below in examples based on advantageous configurations with reference to the drawings. The advantageous further developments and configurations shown in this case are each independent of one another and may be combined with one another as desired depending on how this is necessary in the application. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a sectional view of the shaft encoder arrangement of FIG. 1 in the plane designated by II;

FIG. 3 is a sectional view of another embodiment of a shaft encoder arrangement according to the present invention; and FIG. 4 is a sectional view of another embodiment of a shaft encoder arrangement according to the present invention.

DESCRIPTION OF THE PREFERRED EMBODIMENTS

Figure 1:
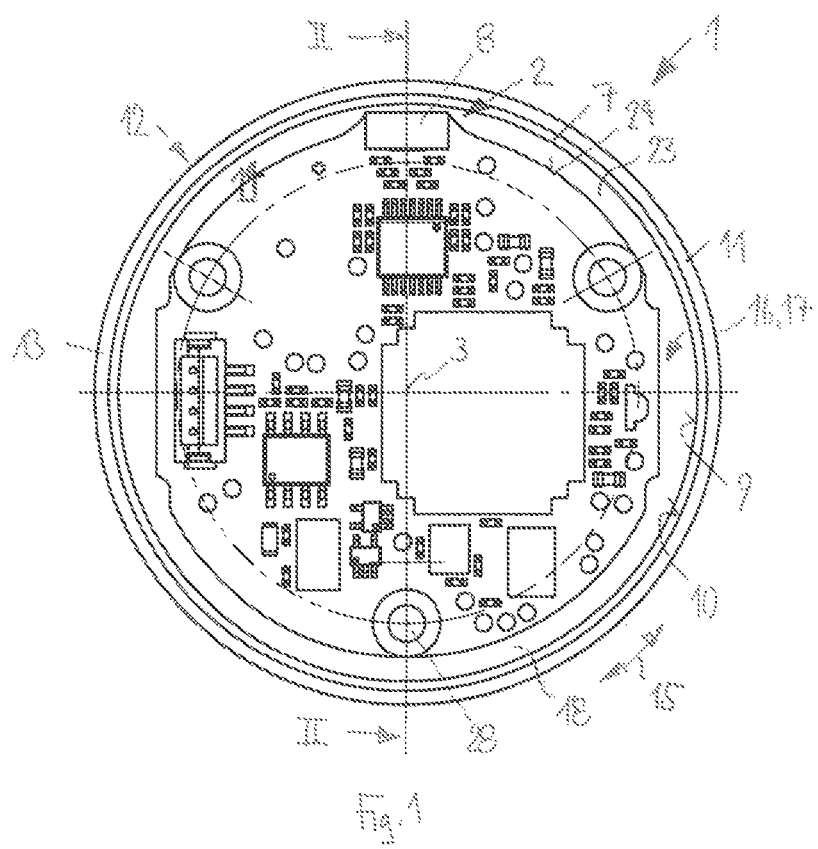
FIG. 1 is a front view of a shaft encoder arrangement according to the present invention.

Referring to the drawings, the structure and operation of a shaft encoder arrangement 1 according to the present invention are first described with reference to FIGS. 1 and 2.

The shaft encoder arrangement 1 shown in the figures comprises a measuring device 2 for determining a rotary position of a body rotatable around an axis 3. The shaft encoder arrangement 1 can be fastened via a fastening section 4 to the body, especially to the shaft 5 of an electric motor 6, indirectly, without interconnected coupling.

The measuring device 2 comprises a circumferential magnetic dimensional scale (also known as a magnetic measuring scale or a magnetic material measure or magnetic material marker) 7, concentric to the axis 3, and a sensor device 8 for scanning the dimensional scale 7. The dimensional scale 7 forms an inner cylindrical jacket surface 9 toward the sensor device 8 and is arranged on a likewise cylindrical inner surface 10 of a cylindrical section 11 of a shield 12. The shield 12 is made of a ferromagnetic material.

The shield 12 may be formed by a shielding body 13, which provides a monolithic basic structure.

The sensor device 8 lies within a space 14 enclosed by the dimensional scale 7 and is enclosed by the circumferential magnetic shield 12.

The shield 12 is used, on the one hand, for the magnetic shielding of the sensor device 8 against external magnetic fields, as they are produced, for example, by an electric motor 6. On the other hand, a mechanical protection is also achieved by the shield 12.

The magnetic measuring principle of the sensor device 8 permits comparatively high tolerances during the mounting. A shaft encoder arrangement 1 according to the present invention may also be mounted by the user.

The dimensional scale 7 may be incremental, for example, so that the current position cannot be determined absolutely without knowledge of the previous positions. For example, magnetic poles with constant distance from one another can be arranged one following the other along the circumferential direction 15.

In another configuration, the dimensional scale 7 may also make possible a measurement of the absolute position without further comparisons. For example, a pseudo random code may be present.

The shielding body 13 forms a receptacle 16 in the form of a recess 17 integrated into the shielding body 13, which is provided on its inner circumferential side 10 with the dimensional scale 7. The receptacle 16 may be created by shaping, for example, deep drawing or bending, or by a machining process such as lathing or milling.

The shield 12 has a disk-shaped section 18, which axially shields the space enclosed by the dimensional scale 7, toward the fastening section 4, i.e., toward the electric motor 6, from which considerable magnetic interference fields may originate. Together with the ring-shaped cylindrical section 11 of the shield 12 holding the dimensional scale 7, a pot or bell shape 19 is thus formed.

The bell 19 may be created monolithically by bending, deep drawing or milling, but may also have a multipart configuration, as long as there is a connection between the components of the bell 19, which forwards the magnetic flow.

The shaft encoder arrangement 1 comprises, further, a support plate arranged at right angles to the axis of rotation 3 in the form of a circuit board or a motherboard, on which the sensor device 8 is mounted.

However, the support plate 20 is preferably made of a ferromagnetic material such that it complements the shield 12. The sensor device 8 is mounted on the support plate. Further, an electronic analysis unit 21 is arranged thereon, which is used for the processing and analysis of the signals coming from the sensor device 8. A signal processing may be carried out according to the principles described above. It may be carried out partly or completely in the electronic analysis unit 21 on the support plate 20 or first in subsequent steps outside of the shaft encoder arrangement 1.

In order to complete the axial shielding of the disk-shaped section 18 of the shield 12 on the side located opposite in the direction of the axis of rotation 3, the sensor device 8 and the electronic analysis unit 21 are preferably located between the disk-shaped section 18 and the support plate 20. The support plate 20, but at least the sensor device 8, is located preferably completely within the cubature 22 of the shield 12. It can close the shield on the side facing away from the electric motor 6. The cubature 22 thereby describes the area of space spanned by the shielding body.

The shaft encoder arrangement 1 preferably has no bearings. Consequently, the support plate 20 with the sensor device 8 and the electronic analysis unit 21 then has no structural connection to the shield 12 and to the dimensional scale 7 located thereon. The support plate 20 and the shield 12 are separated from one another by a circumferential, ring-shaped gap 23.

The gap 23 shall be as small as possible. To prevent the penetration of magnetic interference fields through the gap 23, the support plate 20 may be mounted on its outer circumference 24 toward the electric motor 6 or toward the fastening section 4 and form a circumferential, axially protruding edge (not shown), which is located opposite the dimensional scale 7 and runs parallel and at a distance to the inner cylindrical jacket surface of the dimensional scale 7.

The measuring device 2 is configured for determining a fine value of the rotary position of the shaft 5. In the case shown, this is not absolute over the entire circumference and it is hereby unknown in what partial area of the circumference is precisely being measured. In order to eliminate this ambiguity, the shaft encoder arrangement 1 may have an additional measuring device 25. This additional measuring device 25 is arranged in the center of the shaft encoder arrangement 1 and lies on the axis of rotation 3.

The additional measuring device 25 comprises a one-part or multipart center magnet 26, which is nonrotatably connected to the shielding body 13 and thus rotates with the shaft 5. An additional sensor device 27 detects the magnetic field originating from the center magnet 25. A coarse value of the rotary position of the shaft 5 is subsequently determined therefrom.

An absolute rotary position with fine resolution as well as values derived therefrom such as speed of rotation and rotational acceleration of the shaft 5 can be determined by combining the fine values from the measuring device 2 and the coarse values that are measured with the additional measuring device 25.

Fastening elements 28 are arranged on the support plate 20 for stationary mounting.

The dimensional scale 7 may have a single track or a plurality of tracks. The sensor device 8 may be correspondingly equipped with one or a plurality of sensor elements, which are arranged next to one another and are offset along the axis of rotation 3. A variety of tracks may have, for example, a variety of graduations in order to make possible a measurement according to the Nonius principle. A Wiegand sensor may also be used for detecting, especially the multi-turn position. Because of the highly efficient shield 12 or the shielding body 13, these sensitive detectors may even be used in the vicinity of strong magnetic interference fields. In further embodiments, not shown, a plurality of dimensional scales 7 with corresponding sensor device 8 may, of course, also be present.

The shielding body 13 or the disk-shaped section 18 of the shield 12 may be configured such that it can be pressed onto the shaft 5. As a result, a simple mounting is possible. In other configurations, the shielding body 13 may, for example, be screwed onto the shaft.

Regardless of whether the support plate 20 itself forms a shield, it is advantageous when the open side facing away from the electric motor is shielded by an additional shield 29. The additional shield 29 may be nonrotatably connected to the shield 12 and thus be rotated with the shaft 5 and the fastening section 4.

FIG. 3 shows such a configuration. The additional shield 29 is likewise bell-shaped or pot-shaped and overlaps the shield 12 on the electric motor side in the axial direction, i.e., in the direction of the axis of rotation 3, 30. Viewed in the radial direction 30, the shields 29, 12 thus lie above one another. The additional shield 29 is fastened, for example, welded, soldered, screwed or pressed to the outer circumference 31 of the shield 12.

The stationary support of the support plate 20 is achieved centrally through the additional shield 29 via a support 32 running concentric to the axis of rotation 3. In a modification of the configuration shown in FIG. 3, the additional shield 29 may also be fastened to the inner surface 10 of the shield 12. In this case, the dimensional scale 7 shall no longer be present at this point.

As an alternative, the additional shield 29 may also be connected stationarily, i.e., nonrotatably to the support plate 20. FIG. 4 shows such a configuration. For this, one or a plurality of supports 32 may connect the support plate 20 to the additional shield 29 in a torsionally rigid manner.

The shield 29 is preferably bell-shaped (pot-shaped) again and pushed coaxially over the shield 12. A circumferential, ring-shaped gap 33 is located between the shields 12, 29. In order to reliably shield against magnetic interference fields possibly penetrating through the gap 33, the two shields 12, 29 shall overlap in the axial direction in an as large as possible area. IN this case as well, the two shields thus lie above one another in the radial direction 30.

According to a modification, the additional shield 29 may be arranged within the shield 12. Nevertheless, the large overlaps such as of an additional shield 29 comprising the shield 12 on the electric motor side are then not possible because the dimensional scale 7 must still be scanned.

The support or the supports 32 may especially have a hollow configuration. Thus, e.g., the signal and supply lines of the measuring device 2 or of the electronic analysis unit 21 of the shaft encoder arrangement therein can also be led out.

The feed of a liquid or gaseous medium into the cubature 22 is also possible, as a result of which an expanded temperature range is obtained and/or other media, e.g., undesired contaminations are displaced. For this, one or a plurality of supports may be configured as a fluid line or accommodate a fluid line, through which the medium is fed into the shield 12 or from the shield 29. An opening of the at least one fluid line may be located in the cubature 22.

While specific embodiments of the invention have been shown and described in detail to illustrate the application of the principles of the invention, it will be understood that the invention may be embodied otherwise without departing from such principles.

What is claimed is:

1. A shaft encoder arrangement comprising:
    a rotary position measuring device determining a rotary position of a rotatable body, wherein the measuring device comprises:
        at least one magnetic material dimensional scale fastened to the rotatable body; and
        at least one sensor device positioned to scan the magnetic material dimensional scale based on magnetic measuring of the magnetic material of the dimensional scale, wherein the sensor device lies at least partially within a space at least partially enclosed by the magnetic material dimensional scale;
    a circumferential magnetic shield, wherein the dimensional scale is at least partially enclosed by the circumferential magnetic shield and is nonrotatably mounted on the circumferential magnetic shield; and
    an additional shield, wherein the shield is pushed in the additional shield or the shield is pushed over the additional shield and the additional shield is fastened to the shield with the magnetic material dimensional scale to form a torsionally rigid fastened connection.

2. A shaft encoder arrangement in accordance with claim 1, wherein the circumferential magnetic shield comprises a monolithic shielding body defining a receptacle space, wherein the at least one sensor device is arranged in the receptacle space.

3. A shaft encoder arrangement in accordance with claim 2, wherein:
    the receptacle space is delimited by an inner surface provided with the magnetic material dimensional scale adjacent thereto; and
    the inner surface faces the sensor device and encloses the sensor device in a circumferential direction.

4. A shaft encoder arrangement in accordance with claim 1, wherein the sensor device lies completely within a space enclosed by the magnetic material dimensional scale.

5. A shaft encoder arrangement in accordance with claim 1, further comprising a support plate, which lies at least partially within the space enclosed by the magnetic material dimensional scale, and on which the sensor device is arranged.

6. A shaft encoder arrangement in accordance with claim 5, wherein the support plate is made of a ferromagnetic material.

7. A shaft encoder arrangement in accordance with claim 5, wherein the support plate is structurally separated from the magnetic material dimensional scale by a circumferential gap.

8. A shaft encoder arrangement in accordance with claim 1, wherein the shield has a bell-shaped configuration.

9. A shaft encoder arrangement in accordance with claim 1, wherein the additional shield is bell-shaped.

10. A shaft encoder arrangement in accordance with claim 1, wherein the additional shield is separated from the circumferential magnetic shield, with the magnetic material dimensional scale, by a ring-shaped gap and the additional shield is arranged rotatably relative to the shield.

11. A shaft encoder arrangement in accordance with claim 1, further comprising an additional measuring device with a center magnet, wherein the center magnet is located on the shield.

12. A shaft encoder arrangement in accordance with claim 11, wherein the additional measuring device is arranged within the cubature of the shield.

13. A shaft encoder arrangement comprising
 a rotary position measuring device determining a rotary position of a rotatable body, wherein the measuring device comprises:
  at least one magnetic material dimensional scale fastened to the rotatable body; and
  at least one sensor device positioned to scan the magnetic material dimensional scale based on magnetic measuring of the magnetic material of the dimensional scale, wherein the sensor device lies at least partially within a space at least partially enclosed by the magnetic material dimensional scale;
 a circumferential magnetic shield, wherein the dimensional scale is at least partially enclosed by the circumferential magnetic shield and is nonrotatably mounted on the circumferential magnetic shield;
 an additional shield, wherein the shield is pushed in the additional shield or the shield is pushed over the additional shield; and
 a support plate, which lies at least partially within the space enclosed by the magnetic material dimensional scale, and on which the sensor device is arranged, wherein:
 the additional shield is separated from the shield, with the magnetic material dimensional scale, by a ring-shaped gap;
 the additional shield is connected non-rotatably to the support plate; and
 the additional shield is rotatable relative to the shield.

14. A shaft encoder arrangement comprising:
 a rotatable body for connection with a rotating shaft of an electric motor or of an electric generator or of an electric bake at one side of the rotatable body,
 a rotary position measuring device determining a rotary position of the rotatable body, wherein:
 the measuring device comprises:
  a magnetic material marker formed of magnetic material to provide permanent magnetic values of a given quantity and location, the magnetic material marker being fastened to the rotatable body;
  a support fixed relative to the rotatable body; and
  a magnetic sensor device supported by the support and positioned by the support to scan the magnetic material marker to detect the permanent magnetic values of the given quantity and location of the magnetic material marker, wherein the sensor device is located within a space defined by the magnetic material marker;
 the rotatable body defines a circumferential magnetic shield, wherein the magnetic material marker is within a space delimited by the circumferential magnetic shield and is nonrotatably mounted on the circumferential magnetic shield;
 an additional shield, wherein:
  the support comprises a support plate, which lies at least partially within the space defined by the magnetic material marker, the sensor device being arranged on the support plate and the support plate being held fixed relative to the rotatable body;
  the shield is pushed in the additional shield or the shield is pushed over the additional shield to form a shield enclosure with each of the magnetic material marker and the support plate, with the sensor arranged thereon, positioned within and surrounded by the shield enclosure; and
 an additional measuring device comprising:
  a center magnet, wherein the center magnet is located on the shield defined by the rotatable body; and
  an additional sensor carried by the support plate.

15. A shaft encoder arrangement in accordance with claim 14, wherein the sensor provides a measurement according to the Nonius principle or comprises a Wiegand sensor.

* * * * *